(12) United States Patent
Julien et al.

(10) Patent No.: US 7,220,802 B2
(45) Date of Patent: May 22, 2007

(54) SELF-CROSSLINKING ALKYD DISPERSION

(75) Inventors: Tim Julien, Liberty, MO (US); Dennis Ryer, Kansas City, MO (US); John Willhite, Parkville, MO (US)

(73) Assignee: Cook Composites & Polymers Co., North Kansas City, MO (US)

( * ) Notice: Subject to any disclaimer, the term of this patent is extended or adjusted under 35 U.S.C. 154(b) by 0 days.

(21) Appl. No.: 11/276,494

(22) Filed: Mar. 2, 2006

(65) Prior Publication Data

US 2006/0199941 A1    Sep. 7, 2006

Related U.S. Application Data

(60) Provisional application No. 60/658,522, filed on Mar. 4, 2005.

(51) Int. Cl.
    *C08G 69/44* (2006.01)
    *C08F 20/56* (2006.01)
(52) U.S. Cl. .................. 525/329.4; 525/437; 525/443; 525/445; 525/447; 525/540; 528/288; 528/310; 524/356; 524/501; 524/802; 524/879
(58) Field of Classification Search ............... 525/437, 525/440, 443, 444, 445, 447, 540, 329.4; 524/81, 186, 215, 284, 356, 802, 879, 881, 524/501; 528/288, 310
See application file for complete search history.

(56) References Cited

U.S. PATENT DOCUMENTS

| 4,410,687 | A | 10/1983 | Schimmel et al. | |
|---|---|---|---|---|
| 6,555,625 | B1 * | 4/2003 | Overbeek et al. | 525/191 |
| 6,610,784 | B1 * | 8/2003 | Overbeek et al. | 525/178 |

* cited by examiner

*Primary Examiner*—Duc Truong
(74) *Attorney, Agent, or Firm*—Whyte Hirschboeck Dudek SC

(57) ABSTRACT

A coating composition is produced by forming an aqueous dispersion of a crosslinking agent and a resin that comprises the reaction product of an alkyd polymer, an optional surfalkyd, diacetone acrylamide, another acrylate monomer and optionally aromatic monomers wherein the reaction product is neutralized with either ammonia or an amine. A coating of the aqueous dispersion on wood exhibits at least some of the following desired properties: rapid dry time, good tannin blocking, good resistance to picking up dirt, good hot box stability and good exterior durability. Additionally, the inventive coatings appear to provide improved crosslinking compared to coatings comprising resins not neutralized with an amine or ammonia and/or not containing a surfalkyd.

15 Claims, No Drawings

SELF-CROSSLINKING ALKYD DISPERSION

CROSS REFERENCE TO RELATED APPLICATION

This application claims the benefit of U.S. Provisional Application Ser. No. 60/658,522 filed Mar. 4, 2005, and is incorporated herein by reference.

BACKGROUND OF THE INVENTION

This invention relates generally to alkyd polymer coatings and more specifically to modified alkyd resins useful in coatings and methods for making such resins.

Coatings for wood surfaces desirably have rapid dry times, good tannin blocking, good resistance to picking up dirt, good hot box stability and good exterior durability. While coatings having these properties to some extent are known, improvements in such properties, especially tannin blocking, are still needed.

Tannin is a group of soluble compounds that occur naturally in wood and plant material. The solubility of tannin allows tannin compounds to leach through the wood and the coating thereby forming stains on the surface of the wood or coating. Removal of the tannin from the wood substrate is not practical so the tannin leachate must be blocked from reaching the surface in order to avoid staining. Control of tannin leaching by adding chemical compounds with active ions to the coating prior to application is well known in the art. However, such additives typically have adverse impacts on other properties of the coating, such as viscosity, stability or longevity and/or are not environmentally friendly.

BRIEF SUMMARY OF THE INVENTION

In one embodiment, the invention is a resin comprising the reaction product obtainable by reacting an alkyd polymer (resin) and optionally a surfalkyd with a blend of diacetone acrylamide, acrylate monomers and optionally aromatic monomers to form an acrylated alkyd polymer and neutralizing the acrylated alkyd polymer with either ammonia or an amine.

In another embodiment, the invention is a coating composition that comprises an aqueous dispersion of: (i) a resin, the resin obtainable by reacting an alkyd polymer and optionally a surfalkyd with a blend of diacetone acrylamide, acrylate monomers and optionally aromatic monomers to form an acrylated alkyd polymer and neutralizing the acrylated alkyd polymer with either ammonia or an amine and (ii) a crosslinking agent.

Another embodiment of the invention is a process for making a coating composition, the process comprising: reacting an alkyd polymer and optionally a surfalkyd, with diacetone acrylamide, acrylate monomers and optionally aromatic monomers to form an acrylated alkyd polymer; neutralizing the acrylated alkyd polymer with either ammonia or an amine; and mixing the neutralized acrylated alkyd polymer with water and a crosslinking agent to form an aqueous dispersion. An aqueous resin dispersion comprising at the dispersed form at least one resin according to the invention is another subject of the present invention.

In still another embodiment, the invention is a process for neutralizing an alkyd polymer, the process comprising reacting either ammonia or an amine with an alkyd polymer, more particularly an alkyd polymer (resin) as modified according to the present invention.

DETAILED DESCRIPTION OF THE INVENTION

The following is a description of the process for making the inventive compounds. In all steps, a solvent or a co-solvent may be, and normally or preferably, is present. Suitable co-solvents are known in the art. An example of suitable co-solvent is dipropylene glycol monomethyl ether (DPGMME).

First, an alkyd resin is obtained or made. An alkyd resin is a thermosetting coating polymer that is chemically similar to a polyester. The alkyd resin is formed from the condensation and polymerization of a polyol, a polybasic acid and optionally a monobasic acid that is usually a drying oil modifier. The polyols and acids are reacted or "cooked" (reacted) in a kettle and the water or alcohol produced by the reaction is removed. Cooking (reaction) times are typically 12–24 hours at temperatures of 230–250° C., although higher (longer) or lower (shorter) times or higher or lower temperatures can be used. The degree of polymerization is controlled by the reaction and is indicated by the acid number, with a high acid number indicating free carboxyl groups and incomplete polymerization. The polybasic acids may be unsaturated, typically maleic acid or anhydride, or saturated, for example, phthalic acid or anhydride, isophthalic acid, fumaric acid, trimellitic anhydride and adipic acid. The polyol may typically be glycerol or a glycol such as ethylene glycol, diethylene glycol, glycerol, propylene glycol, dipropylene glycol and neopentyl glycol. Drying oils are usually natural products such as linseed, tung, perilla, soybean, fish and dehydrated castor oils or their fatty acids. Commonly used non-fatty monobasic acids include benzoic, butyl benzoic and dimethylolpropionic acids. Other modifiers include resins such as rosin, phenol-formaldehyde, urea-formaldehyde, styrene, alpha methyl styrene, vinyl toluene, acrylic esters and silicone intermediates, as is well-known in the art. A suitable transesterification catalyst may be used in both methods of preparation, e.g. litharge or a titanium alkoxide. The ratio of reactants used to make the alkyd resin is preferably such as to provide a 5 to 30% excess of polyol over that required to esterify all the acids present. Such alkyd resins are well-known in the art and are readily available from commercial sources, such as Cook Composites and Polymers.

Alkyd resins can be classified by the oil length, which is the number of grams of oil used to make 100 grams of resin (also defined as the percent oil in the resin). Short oil alkyd resins have less than 45% oil, medium oil resins have between 45–55% oil and long oil resins have more than 55% oil. As is known in the art, higher oil lengths generally result in lower resin viscosity, decreased resin hardness, decreased water resistance and increased film flexibility. One skilled in the art can routinely determine an appropriate oil length for the alkyd resin based on the desired resin properties.

Optionally, a surfalkyd (which means a surface active alkyd, or alkyd as surfactant agent) can be used along with the alkyd resin. Surfalkyds may be or are made by the reaction of polyethylene glycol (PEG) and an acid (including polyacids). In one embodiment, the surfalkyd is made using a PEG having a molecular weight of 600. The PEG is reacted in a two-stage condensation reaction with several acids including, first, a dimer fatty acid (DFA) and, second, dehydrogenated castor oil (DCO) fatty acid. The DFA is a blend of 3 parts dimer acid having 2 functionality (2 acid functional groups) and one part of a trimer acid having 3 functionality (3 acid functional groups). The first-stage reaction with DFA builds molecular weight of the alkyd as the trimer acid permits cross-chain branching. In the second stage, the resin from the first stage is reacted with the DCO. The DCO is a $C_{17}$–$C_{19}$ monoacid with 1–3 conjugated double bonds for air-drying properties. The reaction is terminated according to a target acid value and viscosity. The presence of the long residuals from the PEG provide hydrophilic regions to the surfalkyd resin thereby imparting surface active properties. Surfalkyds usable for this invention may also be made according to the teachings of U.S. Pat. No. 4,410,687 incorporated herein by reference.

Next, the alkyd resin is modified and more particularly acrylated by reaction with diacetone acrylamide (DAAM) and other acrylate monomers, optionally in the presence of aromatic monomers. The w/w % of the modifying monomers with respect to the final modified alkyd may vary from about 10% to about 35%, preferably from about 15% to about 30%. The w/w % of DAAM in the final modified alkyd resin may vary from about 1% to about 10%, preferably from about 5% to about 8.5%, with the proviso that the total of modifying monomers satisfies the above cited content. The other acrylate monomers typically are at least one of acrylic acid, methacrylic acid, esters of these acids or acrylonitrile, more preferably acrylic acid or (meth)acrylic ester monomers further comprising acrylic acid. Use of acrylic acid as one of the said acrylates (acrylate monomers), helps impart water dispersibility to the resins. Typically, other reactive monomers are present during the acrylation reaction. Examples of such other reactive monomers are aromatic monomers such as styrene or styrene derivatives including vinyl toluenes. The w/w % of aromatic monomers can vary from 0–40% of the modifying monomers, preferably from about 1% to about 30%, more preferably about 25%. The acid value of the modifying monomers composition may vary from 80–110 mg KOH/g.

The final acid value of the final modified alkyd resin ranges from 21–26 mgKOH/g preferably from 22–25 mg KOH/g.

The molecular weight Mw of the finally resulting modified alkyd resin may vary from about 15,000 to about 25,000 and preferably from about 19,000 to about 21,000.

Initiators are added to induce the acrylate reaction. Such initiators are well known in the art and free-radical initiators such as peroxides or hydroperoxides may be used as suitable initiators. One example of such a suitable initiator is t-butyl-peroxy-2-ethyl hexanoate.

The acrylation reaction is highly exothermic. Therefore, in order to control the reaction temperature, the reactants are normally or even preferably added to the alkyd slowly over a period of time. For example, separate pre-mixtures of the monomers and of the initiators can be added continuously over a two hour period with the reaction temperature held to about 102° C. (215° F.).

The acrylated alkyd reaction mixture is neutralized with an amine or ammonia. A suitable amine is triethylamine (TEA). The reaction mixture is neutralized to an acid value of about 14–17 mg KOH/g at a concentration of 60% solids as measured by ASTM test number D 1639-90. The neutralizing agent (amine) reacts with the acid groups from the acrylic acid in the monomer blend (stage 3). The TEA content may vary from about 1.5% to about 3% and preferably from about 1.5% to about 2.0% and more preferably is about 1.7% of the total weight. The level of amine is added to neutralize up to 97% of the acid on a stoichiometric basis, This method of neutralization has been found to provide optional hot box stability (believed to be done at least party to the amine).

The neutralized acrylated alkyd resin is then dispersed in water and preferably in the presence of a co-solvent. The dispersed resin has a particle size of about 50 to about 120 nm, more typically between about 60 and about 80 nm. The particle size can be achieved and controlled by the agitation shear rate. Using an impeller type paddle blade, the desired particle size was obtained at a paddle tip speed of 2–6 meters/second. A cross-linking agent for (reacting with) the DAAM, preferably adipic dihydrazide (ADHZ) is added to the dispersion. The amount of cross-linking agent in the dispersion may be about 1.6 weight percent based on the total weight of the dispersion. Preferably, the level of the cross-linking agent is selected to provide a 2:1 and more preferably 1:1 stoichiometric ratio with the DAAM. The dispersion has a solids content of about 30–50%, preferably 35–45 weight percent based on the total weight of the dispersion.

The aqueous dispersion is useful as a coating, particularly as a coating for wood. A coating of the aqueous dispersion on wood exhibits at least some of the following desired properties: rapid dry time, good tannin blocking, good resistance to picking up dirt, good hot box stability and good exterior durability. Additionally, the inventive coatings appear to provide improved crosslinking compared to coatings comprising resins not neutralized with an amine or ammonia and/or not containing a surfalkyd or/and not modified as the acrylated alkyd polymer.

Oxidatively cured resins, i.e. alkyds, cure based on the crosslinking of conjugated double bond present in the drying oils found in the alkyd (eleosteric, linoleic, etc.). This drying reaction may require the addition of small levels of heavy metal compounds (zinc, cobalt, manganese salts). However, the resin described in the present invention can cure without the addition of driers, via the ADHZ/DAAM reaction. This provides the following benefits Safety—workers do not need to handle heavy metals
Lower VOC—the metal salts are always added in a solvent based carrier
Ease of formulation—the addition of solvent-borne additives in a water based system can be tricky. The metal salt may not be stable in the water phase

EXAMPLE 1

A compound of the invention was made in a multiple stage process as outlined in Table 1 and explained in more detail below.

In Stage 1, the medium oil alkyd is charged to an agitated reaction vessel and heated to 99–102° C. (210–215° F.). The reaction vessel has a tank diameter: blade length ratio between about 1:0.5 to about 1:0.7. The vessel comprised an impeller type paddle that rotated between 80–100 rpm providing a tip speed between 2–6 m/s. Then, in Stage 2, DPGMME solvent is charged into the reactor and the alkyd/solvent blend is agitated at maximum speed to dissolve and disperse the alkyd.

TABLE 1

Ingredient Introduction List

| Ingredient | Stage | Weight (lbs.) |
|---|---|---|
| Medium Oil Alkyd | 1 | 307.30 |
| DPGMME* | 2 | 25.00 |
| Acrylic Acid | 3 | 9.80 |
| Isobutyl Methacrylate | 3 | 13.00 |
| Styrene (45-55 TBC) | 3 | 22.00 |

TABLE 1-continued

Ingredient Introduction List

| Ingredient | Stage | Weight (lbs.) |
|---|---|---|
| Diacetone Acrylamide | 3 | 32.00 |
| DPGMME | 4 | 2.00 |
| t-Butyl Peroxy-2-ethyl hexanoate | 4 | 1.53 |
| DPGMME | 5 | 1.48 |
| DPGMME | 6 | 6.00 |
| t-Butyl Peroxy-2-ethyl hexanoate | 6 | 8.00 |
| DPGMME | 7 | 0.52 |
| Triethyl amine | 8 | 17.00 |
| Deionized Water | 9 | 507.77 |
| Acticide Biocide | 10 | 0.80 |
| 2 Hydroxymethyl Aminoethanol | 10 | 0.80 |
| Adipic Acid(**) Dihydrazide | 11 | 16.00 |
| Deionized Water | 12 | 29.00 |

*DPGMME is dipropylene glycol monomethyl ether
(**)The ADHZ is listed on the supplier material safety data sheet as Adipic Dihydrazide and as Adipic Acid Dihydrazide. The CAS # is 1071-93-8

Next, in Stage 3, the monomers used for acrylation (acrylic acid, isobutyl methacrylate, styrene, diacetone acrylamide) are premixed. The acid value of the monomer pre-mixture should be 95–104 mg KOH/g as measured by ASTM D 1639–90. Likewise, in Stage 4, the initiator (T-butyl peroxy-2-ethyl hexanoate) and DPGMME solvent are premixed just before addition. The initiator pre-mixture tank is blanketed with nitrogen.

Next, the acrylation reaction is conducted by adding the monomer pre-mixture and the initiator/solvent pre-mixture continuously over an about two hour period while the batch temperature is between about 99–102° C. (210–215° F.). In order to control the reaction rate and temperature rise, the addition of the monomer pre-mixture and the initiator pre-mixture is interrupted if the temperature falls below 99° C. (210° F.) or rises above 102° C. (215° F.). Thereafter, in Stage 5, after monomers are fully charged into the reactor, the monomer pump is rinsed with DPGMME solvent and the reaction is continued for one hour maintaining a temperature of 99–102° C. (210–215° F.). The acid value is checked after the one hour time period. In Stage 6, further premixed initiator is added evenly and continuously over a period of 1½ hours as a "kicker" to complete the acrylation reaction. In stage 7, after the blend of initiator/solvent pre-mixture "kicker" is added in Stage 6, the pump and lines for mixing and adding the initiator pre-mixture are rinsed with additional solvent. After introduction of the "kicker", the reaction is continued at 99–102° C. (210–215° F.), until a present viscosity of V–X is met at 60% solids as measured by a bubble viscometer. At this point, the acid value and resin color are checked and recorded.

Next, the neutralization begins in Stage 8 by cooling the batch to about 90° C. (195° F.), followed by turning off the cooling. The neutralizing amine, in this case triethylamine, is fed into the reactor via a sub-surface feeding the tube over a period of 30–45 minutes after which the reaction mixture is held under mixing for one hour allowing the batch temperature to drop to about 82–88° C. (180–190° F.). During the one hour hold the pH is checked to verify that the reaction mixture is within the target range, which is 8.2–9.0. If the pH is less than 8.2, additional amine neutralizing agent is added as needed.

Next, the neutralized mixture is phase-shifted from a solvent phase to an aqueous phase. In Stage 9, after the one hour hold, heated deionised water is added over a period of 2½ hours. The batch temperature is allowed to drop to about 65–71° C. (150–160° F.). The reactor contents are then checked for inversion. After all the water is in, the mixture is cooled to about 24–27° C. (75–80° F.) as quickly as possible. During the cooling, in Stage 10, at a temperature of 49° C. (120° F.) or lower, a biocide is added and the biocide addition pump and line are rinsed with water. The 2-hydroxylmethyl aminoethanol is then added and the mixture is mixed for thirty minutes. Subsequently, in Stage 11, at a temperature of about 32° C. (90° F.) or lower the adipic acid dihydrazide is added and the mixture is mixed for an additional thirty minutes while cooling to desired temperature of 24–27° C. (75–80° F.). Finally, in Stage 12, the aqueous dispersion is adjusted to specifications using deionized water.

EXAMPLES 1–3 COMPARISON

Three examples of the coating of the invention were made and applied to a wooden substrate for comparison testing. Example 1 was a coating prepared as above. Example 2 included a surfalkyd that was made according to U.S. Pat. No. 4,410,687 along with the medium oil alkyd in Stage 1. Example 3 differs from Example 1 in that ammonia was used instead of TEA for the neutralizing agent. The three examples were standardized to approximately the same viscosity and acid value.

TABLE 2

Coating Performance Comparison

| | Example 2 | Example 1 | Example 3 |
|---|---|---|---|
| Formulation component | | | |
| Surfalkyd (as disclosed in the description) | Present | Absent | Absent |
| Neutralizing Agent | Amine | Amine | NH$_4$OH |
| DPGMME Co Solvent | 1% | 4% | 3.5% based on total formula |
| Coating properties | | | |
| Tannin Blocking[1,2] | Poor | Poor[1]/Good[2] | Good |
| Hot Box Stability[1,2] | Good | Good | Poor |
| Dirt Pick Up[2] | Relatively poor | Relatively good | Relatively good |
| VOC | Relatively low | Relatively high | Relatively high |

[1]based on CCP test results
[2]based on 3rd party test results (3rd party rating based on onsite use as a deck coating)

The CCP tannin blocking test is done according to the following test conditions:

The test method for the tannin blocking involves painting a white primer made from the resin over redwood and Western Red Cedar Boards. Multiple stripes of different primers are painted on the same board for comparison. These are allowed to cure for 24 hours and are all of them then top-coated with a white exterior grade of house paint. This cures for an additional 24 hours. These two species of wood have high tannin content that bleeds into the paint that will discolor it by making it darker and yellower.

Color readings (CIELab) are taken on the boards and the back of the boards are marked where these readings were taken. The boards are then placed into a Cleveland Condensation Tester (CCT). The CCT is set at 38° C. (100° F.). The boards are exposed to this high humidity for 96 hours. The boards are allowed to dry and then new color readings are taken on the same spot that was marked. The color difference is calculated as Delta E.

Excellent performance is a color difference less than 0.5. Good performance is rated as 0.5–1.5. Medium is between 1.5 and 5. Poor performance is rated when the color difference is greater than 5.

The CCP hot box stability test is done according to the following test conditions:

Hot box stability is done by placing samples into an oven at an elevated temperature to accelerate what happens with long-term aging at room temperature. Either four weeks at 50° C. or 10 days at 60° C. are used. Separation of the coating that will not return to a uniform state after stirring is one cause of failure. Large changes in viscosity, pH or molecular weight are also causes for failure. Properties are checked of coating films after being in the hot box to ensure that all properties are maintained, including but are not limited to, dry time, hardness, flexibility and humidity resistance.

As can be seen from Table 2, use of a surfalkyd permits the coating dispersion to be made with lower levels of co-solvent which, in turn, provides for a lower VOC for the dispersion. The current "surfalkyd" decreases the rating for dirt pick-up (e.g., the dirt pickup is poor (worse) when a surfalkyd is present). The use of amine neutralizing agent provides better hot box stability than ammonia neutralizing agent. When higher levels of co-solvent are used, the "surfalkyd" can be removed from the formula and still maintain good hot box stability. The differences in co-solvent levels among Examples 1–3 are not believed to affect either hot box stability or tannin blocking.

EXAMPLE 1 AND COMPARATIVE SAMPLES A AND B

The drying times of the coating of the invention where compared to two existing coatings. Example 1 was a coating prepared as above. Comparative Sample A is a modified version of commercially available CHEMPOL® 821–1364 which is available from Cook Composites and Polymers. Comparative Sample A differs from the commercially available product by being neutralized with TEA. The formula of Comparative Sample A is similar to Example 1, although Comparative Sample 1 lacks the cross-linking agent DAAM and contains dryers, which are not present in Example 1.

Comparative Sample B is a commercially available aqueous alkyd dispersion RESYDOL® AY586w/45WA. The respective coatings were applied to a surface and allowed to dry at room temperature. Table 3 shows the drying times to various levels of dryness. The drying times of Example 1 are equal to, or faster than, the drying times of the comparative existing aqueous alkyd dispersion coatings. The improvement in drying times for Example 1 is achieved even though Example 1 lacks drying agents, which are found in the comparative samples.

In compliance with the statute, the invention has been described in language more or less specific as to chemical and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

TABLE 3

Dry Times

|  | Example 1 | Comparative Sample A | Comparative Sample B |
| --- | --- | --- | --- |
| Set-to-Touch | 7–9 min. | 7–9 min. | 7–9 min. |
| 200 gm Zapon | 35 min. | 35 min. | 2 hr. 40 min. |
| 500 gm Zapon | 1 hr. | 1 hr. | 3 hr. 25 min. |
| Dry Hard | 2 hr. 10 min. | Greater than 6 hr. 15 min. | 5 hr. 40 min. |

What is claimed is:

1. A resin comprising the reaction product obtained by reacting an alkyd polymer, and optionally a surfalkyd, with a blend of diacetone acrylamide, acrylate monomers and optionally aromatic monomers to form an acrylated alkyd polymer and neutralizing the acrylated alkyd polymer with either ammonia or an amine.

2. The resin according to claim 1, wherein the acrylate monomers is or comprises acrylic acid.

3. The resin according to claim 1, wherein the surfalkyd is present and wherein, it is the reaction product of a polyethylene glycol and of an acid.

4. The resin of claim 1, wherein amine is neutralizing the acrylated alkyd polymer.

5. The resin of claim 1, wherein the acrylated alkyd polymer is obtained in the absence of a surfalkyd.

6. An aqueous resin dispersion, wherein it comprises at the dispersed form, at least one resin according to claim 1.

7. A coating composition comprising:
    an aqueous dispersion of: (i) a resin, the resin obtained by reacting an alkyd polymer, and optionally a surfalkyd, with a blend of diacetone aciylamide, acrylate monomers, and optionally aromatic monomers to form an acrylated alkyd polymer and neutralizing the acrylated alkyd polymer with either ammonia or an amine and (ii) a crosslinking agent.

8. The coating composition according to claim 7, wherein a co-solvent is present in the aqueous dispersion.

9. The coating composition according to claim 7, wherein the cross-linking agent is adipic dihydrazide.

10. The coating composition of claim 7, wherein the resin dispensed in the aqueous dispersion has a particle size of about 50 to about 120 nm.

11. A process for making a coating composition, the process comprising:
    reacting an alkyd polymer, an optional surfalkyd, a blend of diacetone acrylamide, acrylate monomers, and optionally aromatic monomers to form an acrylated alkyd polymer;
    neutralizing the acrylated alkyd polymer with either ammonia or an amine; and,
    mixing the neutralized acrylated alkyd polymer with water and a cross-linking agent to form an aqueous dispersion.

12. The process for neutralizing an alkyd polymer as defined according to claim 11, the process comprising reacting either ammonia or an amine with the alkyd polymer.

13. The process of claim 11, wherein the acrylate monomer comprises acrylic acid.

14. The process of claim 11, wherein the surfalkyd is a reaction product of polyethylene glycol and an acid.

15. The process of claim 11, wherein the cross-linking agent is adipic dihydrazide.

* * * * *